US008085683B2

(12) United States Patent
Leith et al.

(10) Patent No.: US 8,085,683 B2
(45) Date of Patent: Dec. 27, 2011

(54) METHOD AND APPARATUS FOR ESTIMATING LINK QUALITY

(75) Inventors: Douglas Leith, Dublin (IE); David Malone, Maynooth (IE); Domenico Giustiniano, Barcelona (ES)

(73) Assignee: National University of Ireland Maynooth, Maynooth (IE)

( * ) Notice: Subject to any disclaimer, the term of this patent is extended or adjusted under 35 U.S.C. 154(b) by 148 days.

(21) Appl. No.: 12/415,185

(22) Filed: Mar. 31, 2009

(65) Prior Publication Data

US 2009/0252053 A1 Oct. 8, 2009

(30) Foreign Application Priority Data

Apr. 2, 2008 (IE) .................................. S2008/0254

(51) Int. Cl.
*H04J 1/16* (2006.01)
(52) U.S. Cl. ........................ 370/252; 370/445
(58) Field of Classification Search .................. 370/241, 370/252, 253, 310, 328, 338, 431, 458, 461, 370/462, 455; 455/39, 67.11, 67.13
See application file for complete search history.

(56) References Cited

U.S. PATENT DOCUMENTS

| | | | | |
|---|---|---|---|---|
| 2005/0053037 A1* | 3/2005 | Ginzburg et al. | ............. | 370/333 |
| 2007/0115847 A1* | 5/2007 | Strutt et al. | .................. | 370/252 |
| 2007/0242621 A1* | 10/2007 | Nandagopalan et al. | ..... | 370/254 |
| 2009/0052411 A1* | 2/2009 | Leung et al. | .................. | 370/338 |
| 2009/0147678 A1* | 6/2009 | Xhafa et al. | .................. | 370/232 |

OTHER PUBLICATIONS

Giustiniano, Domenico, "Experimental Assessment of 802.11 MAC Layer Channel Estimators," IEEE Communications Letters, Dec. 2007, pp. 961-963, vol. 11, Issue 12, IEEE.
Malone, D., "MAC Layer Channel Quality Measurement in 802.11," IEEE Communications Letters, Feb. 2007, pp. 143-145, vol. 11, Issue 2, IEEE.

* cited by examiner

*Primary Examiner* — Kwang B Yao
*Assistant Examiner* — Obaidul Huq
(74) *Attorney, Agent, or Firm* — Withrow & Terranova, P.L.L.C.

(57) ABSTRACT

A driver for an IEEE 802.11 wireless network node determines a metric for link quality between the node and a remote node. The nodes communicate using a handshake protocol in which the first node expects to receive an acknowledgement (ACK) of receipt of a data packet from the remote node. The driver provides a measure for: collision induced losses (pc) between the first and remote nodes; a slot being erroneously detected as busy when a successful transmission could have been made (pexp) between the first and remote nodes; and a probability of successful reception of a packet when a collision occurs (pplc) between the first and remote nodes. The measure is based on a number (A) of acknowledgements received from the remote node vis-à-vis a number (T) of packets transmitted to the remote node. The driver can adjust one of carrier sensitivity or node transmission power based on the measure.

15 Claims, 5 Drawing Sheets

|  | Successful and unsuccessful TX slot counters | Idle and other transmissions slot counters |
|---|---|---|
| $T_0$ | TX of normal traffic | |
| $T_1$ | TX of PIFS traffic, first frag. | |
| $T_S$ | TX of subsequent frag. | |
| $A_0$ | ACK of normal traffic | |
| $A_1$ | ACK of PIFS traffic, first frag. | |
| $A_S$ | ACK of subsequent frag. | |
| $I$ | | idle slots |
| $R$ | | slots we do not TX in |

|  | Probability of | Estimator |
|---|---|---|
| $p_c$ | collision | $1 - (T_1 \cdot A_0)/(T_0 \cdot A_1)$ |
| $p_n$ | noise interference err. | $1 - A_S/T_S$ |
| $p_h$ | hidden node err. | $1 - (A_1 \cdot T_S)/(A_S \cdot T_1)$ |
| $p_{exp} + p_{ptc}$ | exposed and capture effect | $(T_1 \cdot A_0)/(T_0 \cdot A_1) - I/R$ |

(a) CCA=−80dBm (b) CCA=−60dBm

METHOD AND APPARATUS FOR ESTIMATING LINK QUALITY

This application claims priority to Irish patent application number S2008/0254 filed Apr. 2, 2008, the disclosure of which is incorporated herein by reference in its entirety.

FIELD OF THE INVENTION

The present invention relates to a method and apparatus for estimating link quality experienced by communicating stations in an 802.11 WLAN.

BACKGROUND

In 802.11 WLANs, the basic mechanism controlling medium access is the Distributed Coordination Function (DCF). This is a random access scheme, based on Carrier Sense Multiple Access with Collision Avoidance (CSMA/CA).

In the DCF Basic Access mode, a station with a new packet to transmit selects a random backoff counter in the range [0,CW-1] where CW is the Contention Window. Time is slotted and, if the channel is sensed idle, the station first waits for a Distributed Inter-Frame Space (DIFS), then decrements the backoff counter for each physical layer (PHY) time slot. If the channel is detected busy, the countdown is halted and only resumed after the channel is detected idle again for a DIFS. Channel idle/busy status is sensed via:
- CCA (Clear Channel Assessment) at physical level which is based on a carrier sense threshold for energy detection, e.g. −80 dBm. CCA is expected to be updated every physical slot time. It aims to detect transmissions within the interference range.
- NAV (Network Allocation Vector) timer, also called virtual carrier sense, at media access control (MAC) level which is encapsulated in the MAC header of each 802.11 frame and is used to accurately predict the end of a received frame on air. It is naturally updated once per packet and can only gather information from stations within the decoding range.

Figure 1:
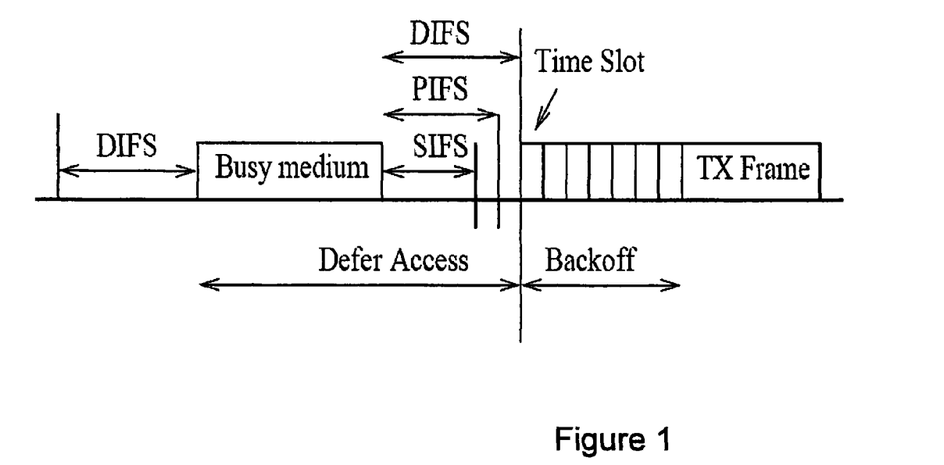
FIG. 1 illustrates a distributed coordination function (DCF) protocol.

The channel is detected as idle if the CCA detects the channel as idle and the NAV is zero. Otherwise, the channel is detected as busy. A station transmits when the backoff counter reaches zero. The countdown process is illustrated schematically in FIG. 1. The 802.11 handshake imposes a half-duplex process whereby an acknowledgment (ACK) is always sent by the receiver upon the successful receipt of a unicast frame. The ACK is sent after a period of time called the Short Inter Frame Space (SIFS). As the SIFS is shorter than a DIFS, no other station is able to detect the channel idle for a DIFS until the end of the ACK transmission. If the transmitting station does not receive the ACK within a specified ACK Timeout, or it detects the transmission of a different packet on the channel, it reschedules the packet transmission according to the given backoff rules. CW is doubled with successive referrals until a maximum value (labeled as CWmax) and is reset to the minimum value (labeled as CWmin) after an ACKed transmission or once the maximum number of retransmission attempts is reached.

In addition to the foregoing Basic Access mode, an optional four way handshaking technique, known as Request-To-Send/Clear-To-Send (RTS/CTS) mode is available. Before transmitting a packet, a station operating in RTS/CTS mode reserves the channel by sending a special Request-To-Send short frame. The destination station acknowledges the receipt of an RTS by sending back a Clear-To-Send frame, after which normal packet transmission and ACK response occurs.

Figure 2:
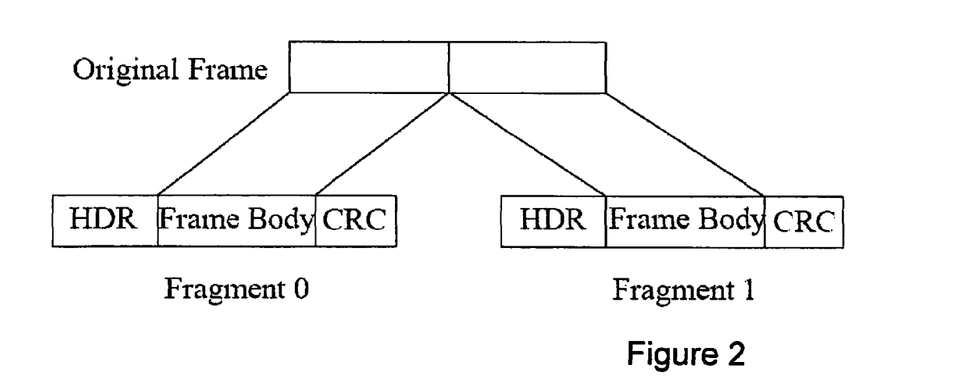
FIG. 2 illustrates fragmentation of an 802.11 frame.

The DCF allows the fragmentation of packets into smaller units. Each fragment is sent as an ordinary 802.11 frame, which the sender expects to be ACKed. However, the fragments may be sent as a burst. That is, the first fragment contends for medium access as usual. When the first fragment is successfully sent, subsequent fragments are sent after a SIFS, so no collisions are possible. In addition, the medium is reserved using virtual carrier sense for the next fragment both at the sender (by setting the 802.11 NAV field in the fragment) and at the receiver (by updating the NAV in the ACK). This is illustrated schematically in FIG. 2. Burst transmission is halted after the last fragment has been sent or when loss is detected.

In a WLAN, link impairments (and so quality) are intimately linked to MAC operation and so typically cannot be estimated purely on the basis of PHY measurements such as signal-to-noise ratio (SNR). Nonetheless, higher level measurements such as throughput and delay statistics can have difficulty distinguishing between sources of channel impairment.

Tasks such as rate adaptation, channel allocation, contention window selection, power control and carrier sense selection—essential for improving and optimizing the network performance—all depend crucially on the availability of suitable link quality measurements, and it is the current lack of such measurements that underlies the poor performance of many approaches currently implemented in commodity hardware.

For example, at present, rate adaptation is in practice commonly based on the number of transmission retries (e.g. a typical approach might involve lowering the rate after n retries and increasing the rate after m successful transmissions). However, since the number of retries is affected not just by channel noise but is also closely linked to the number of contending stations (with associated collision related losses), this can easily lead to poor performance, see K Ramachandran et al., "Scalability analysis of Rate Adaptation Techniques in Congested IEEE 802.11 Networks: An ORBIT Testbed Comparative Study", *Proc. IEEE WoWMoM*, 2007, the disclosure of which is incorporated herein by reference. Similar problems occur in the presence of hidden nodes, e.g. see S Wong, et al., "Robust Rate Adaptation for 802.11 Wireless Networks", *Proc. ACM MobiCom*, 2006, the disclosure of which is incorporated herein by reference.

The consideration of link quality measurements is particularly topical since the trend towards increasingly dense wireless deployments is creating a real need for effective approaches for channel allocation/hopping, power control, etc. for interference mitigation see R. Gummadi, D. Wetherall, B. Greenstein, S. Seshan, "Understanding and Mitigating the Impact of RF Interference on 802.11 Networks", Sigcomm 2007; and I. Broustis, J. Eriksson, S. Krishnamurthy, M. Faloutsos "Implications of Power Control in Wireless Networks: A Quantitative Study", *Proc. PAM*, 2007, the disclosures of which are incorporated herein by reference.

Also, new applications such as mesh networks and media distribution within the home are creating new quality of service demands that require more sophisticated approaches to radio resource allocation, see Bruno, R.; Conti, M.; Gregori, "Mesh networks: commodity multi-hop ad hoc networks", *Proc. IEEE Communications Magazine*, March 2005, the disclosure of which is incorporated herein by reference.

Previous work on 802.11 channel quality estimation can be classified into three categories. First, PHY link-level approaches use Signal-to-Noise Ratio (SNR)/Received Signal Strength Indication (RSSI) to directly estimate the link quality.

Second, MAC approaches rely on throughput and delay statistics, or frame loss statistics derived from transmitted frames which are not ACKed and/or from signaling messages. Finally cross-layer MAC/PHY approaches aim to combine information at both MAC and PHY layers.

Most work on PHY layer approaches is based on SNR and RSSI measurements, for example, D Qiao and S Choi, "Goodput Enhancement of IEEE 802.11a Wireless LAN via Link Adaptation", *Proc. IEEE ICC*, 2001; and I. Haratcherev, K. Langendoen, R. Lagendijk and H. Sips, "Hybrid Rate Control for IEEE 802.11", *Proc. ACM, MobiWac*, 2004, the disclosures of which are incorporated herein by reference. The basic idea is to a priori map SNR measures into MAC channel quality estimates.

However,
  i) SNR/RSSI methods are not able to distinguish between different sources of channel impairment at the MAC layer (e.g. between collision and noise related losses),
  ii) the mapping between measured SNR and delivery probability rate is generally specific to each link and may be time varying, see C. Reis, R. Mahajan, M. Rodrig, D. Wetherall, J. Zahorjan "Measurement-Based Models of Delivert and Interference", Sigcomm 2006, the disclosure of which is incorporated herein by reference, and
  iii) the correlation between SNR/RSSI and actual packet delivery rate can be weak, see D Aguayo, et al. "Link-level measurements from an 802.11b mesh network", Proc. ACM SIGCOMM, 2004, the disclosure of which is incorporated herein by reference.

With regard to MAC approaches, RTS/CTS signaling can be used to distinguish collisions from channel noise losses, see for example, D J Leith, P Clifford, "A Self-Managed Distributed Channel Selection Algorithm for WLANs", Proc. IEEE RAWNET, Boston, 2006; and J Kim, et al. "CARA: Collision-Aware Rate Adaptation for IEEE 802.11 WLANs", Proc. IEEE INFOCOM, 2006, the disclosures of which are incorporated herein by reference. However, such approaches can perform poorly in the presence of hidden nodes and other types of channel impairment.

K J Yu, et al., "A novel hidden station detection mechanism in IEEE 802.11 WLAN", IEEE Comms Let., 10(8):608-610, August 2006, the disclosure of which is incorporated herein by reference, considers an approximate MAC layer approach for detecting the presence of hidden nodes but does not consider other types of channel impairment.

With regard to combined MAC/PHY approaches, early work related to the present paper is presented in D Malone, et al. "MAC Layer Channel Quality Measurement in 802.11", IEEE Comms Let., 11(2):143-145, February 2007; and D Giustiniano, et al. "Experimental Assessment of 802.11 MAC Layer Channel Estimators", IEEE Comms Let., 11(12):961-963, December 2007, the disclosures of which are incorporated herein by reference. However, this uses a channel busy/idle approach that is confined to distinguishing between collision and noise related losses and does not allow consideration of hidden nodes or exposed node and capture effects.

DISCLOSURE OF THE INVENTION

The present invention provides a MAC/PHY cross-layer approach to determine channel status and the impact of different performance impairments on link quality, particularly in 802.11 WLANs.

The invention is based on the several observations including, for example, that frame loss due to collisions is a feature of normal operation in 802.11 WLANs and thus losses due to collisions and losses due to channel impairment should be distinguished in assessing link quality. Similarly, hidden nodes effects, exposed nodes, capture effects etc are all associated with cross-layer issues.

The benefits arising from the availability of accurate and reliable link quality data are considerable. The availability of a measure of the loss rate specifically induced by channel noise allows much more effective rate adaptation to be employed. Similarly, channel selection is fundamentally related to channel impairments and typically depends upon the availability of an appropriate link quality metric, which can then be optimised by a suitable search over available channels. Effective carrier sense adjustment and transmit power are also strongly dependent on link measurements.

Unlike previous approaches, the present invention explicitly classifies channel impairments into noise-related losses, collision induced losses, hidden-node losses and considers related issues of exposed nodes and capture effects. The invention distinguishes among these different types of impairments and provides separate quantitative measures of the severity of each type of impairment.

Embodiments of the invention take advantage of the native characteristics of the 802.11 protocol (such as timing constraints, channel busy detection and so on)—without requiring any modification to the 802.11 protocol. As such, the invention is suited to implementation on commodity hardware

BRIEF DESCRIPTION OF THE DRAWINGS

An embodiment of the invention will now be described, by way of example, with reference to the accompanying drawings, in which.

DESCRIPTION OF THE PREFERRED EMBODIMENT

Before describing the preferred embodiment of the present invention, we would first of all outline the main impairments that can affect transmissions between an 802.11 sender and receiver.

It is first of all important to emphasize that a two-way (or four-way with RTS-CTS) handshake is used in 802.11. Hence, the quality of a link is determined by the channel conditions at both the sender and the receiver stations. For example, low link-quality at the receiver can mean that data packets transmitted by the sender cannot be decoded at the receiver. Similarly, low link-quality at the sender can mean that ACK packets transmitted by the receiver cannot be decoded at the sender. Thus:

Measuring the SNR (or other local properties) at either the sender or receiver alone is insufficient to determine the link quality. Instead it is necessary to recognize the intrinsically two-way nature of a link in 802.11 when measuring its quality.

Links are directional since data packets and ACKs may have different properties e.g. coding rate, duration, NAV protection. Collisions and interference with transmissions by other stations can therefore affect each end of a link differently.

Since each station is typically located in a different physical position, its local radio environment is generally different from that of other stations. Hence, link quality between each sender-receiver pair must be measured individually. In particular, the properties of one link cannot be reliably inferred from measurements taken on another link, even if the links share a common sender e.g. the AP in an infrastructure mode WLAN. Further, due to the directional nature of link quality (see above), quality in each direction should be measured separately and generally measurements from one direction cannot be used to reliably infer the quality in the opposite direction.

According to the present invention, five main types of link impairment are defined when using the 802.11 DCF.

1) Collisions: Collisions are part of the correct operation of CSMA/CA. A collision occurs whenever two or more stations have simultaneously decremented their backoff counter to 0 and then transmit. Note that collisions can only occur on data packet transmissions. The level of collision induced packet losses is strongly load dependent. For example, 802.11b with four saturated nodes has a collision probability of around 14% while with 20 saturated nodes the collision probability is around 40%, see G Bianchi, "Performance analysis of IEEE 802.11 distributed coordination function", IEEE J. Sel Area Comm, 18(3):535-547, March 2000, the disclosure of which is incorporated herein by reference. We denote by pc the probability that a transmitted data frame is lost due to a collision.

2) Hidden nodes: Frame corruption due to concurrent transmissions other than collisions is referred to as hidden node interference. We denote by ph,data the probability that a data transmission fails to be received correctly due to hidden node interference. Similarly, we denote by ph,ack the probability that an ACK transmission is lost due to hidden node interference. A lost data packet or a lost ACK both lead to a failed transmission and so we combine data and ACK losses into an overall hidden node error probability ph.

3) Noise errors: Frame corruption due to sources other than transmissions by other 802.11 stations is referred to as noise losses. We denote by pn,data (respectively, pn,ack) the probability that a data (respectively, ACK) frame is lost due to noise related errors. Since data and ACK losses both lead to a failed transmission we lump these together into a combined noise loss probability pn.

4) Exposed nodes: Not all link impairments lead to frame loss. One such important issue is that the carrier sense mechanism used in 802.11 to sense channel busy conditions may incorrectly classify the conditions. We denote by pexp the probability that a slot is erroneously detected as busy when in fact a successful transmission could have been made. Such errors lead to an unnecessary pause in the backoff countdown and so to a reduction in achievable throughput.

5) Capture effect: A second impairment which does not cause losses is the so-called physical layer capture (PLC). Specifically, we denote by pplc the probability of successful reception of a frame when a collision occurs. This can occur, for example, when the colliding transmissions have different received signal power—the receiver may then be able to decode the higher power frame. For example, A Kochut, et al., "Sniffing out the correct physical layer capture model in 802.11b", *Proc. IEEE ICNP,* 2004, the disclosure of which is incorporated herein by reference, shows that for 802.11b and also 802.11g, PLC can occur when a frame with higher received power arrives within the physical layer preamble of a lower power frame. Differences in received power can easily occur due to differences in the physical location of the transmitters (one station may be closer to the receiver than others), differences in antenna gain etc. The physical layer capture effect can lead to severe imbalance of the network resource and hence in the thoughputs achieved by contending stations (and so to unfairness).

The present invention provides an estimation framework capable of distinguishing the different types of link impairment and providing quantitative measurements of link quality. The preferred embodiment makes use of the following properties of the 802.11 MAC:

Time is slotted, with well-defined boundaries at which frame transmissions by a station are permitted.

The standard data-ACK handshake is affected by all types of link impairment considered and a sender-side analysis can reveal any loss.

When fragmentation is enabled, second and subsequent fragment transmissions are protected from collisions and hidden nodes by the NAV values in the fragments and ACKs. Hidden nodes that are unable to decode either NAV value are treated as channel noise. Instead of using fragments, TXOP packet bursting can be used, although this is only available in 802.11e, and would require the NAV value in the MAC ACK to be set. RTS/CTS might also be used, but in practice can perform poorly, as explained in more detail later.

Transmissions occurring before a DIFS are protected from collisions. This is used, for example, to protect ACK transmissions, which are transmitted after a SIFS interval. The 802.11 DCF also permits transmissions after a PIFS (Priority Interframe Spacing) interval (with SIFS<PIFS<DIFS) and while the full 802.11 Point Coordination Function (PCF) is rarely implemented on commodity interface cards, the ability to transmit after a PIFS is widely available on modem hardware (e.g. as part of the so-called multimedia extensions that are a subset of 802.11e).

A. Estimating Noise Errors

Consider a station sending fragmented packets to a given receiver. Each fragment is immediately acked by the receiver when it arrives, allowing detection of loss. Fragments are sent back to back with a SIFS interval between them. Hence, second and subsequent packets are protected from collisions. Importantly, fragment ACK frames update the NAV and so the fragment-ACK handshake is akin to an RTS-CTS exchange from the point of view of hidden nodes. Hence, second and subsequent fragments are also protected from hidden node collisions. That is, while the first fragment will be subject to collisions, noise and hidden node errors, subsequent fragments are only subject to noise errors and we have that $$P[\text{fragment success}] = A_S/T_S = (1-pn), \quad (1)$$

where the station transmits $T_S$ second and subsequent data frames and of these $A_S$ are successful because an ACK is received. We can therefore directly estimate the probability of noise errors pn from the fraction of second and subsequent fragments with no ACK, $$pn = 1 - A_S/T_S \qquad (2)$$

Since the impact of noise losses is dependent on frame length (longer frames typically having higher probability of experiencing bit errors), we must select the fragment size to be equal to the packet size used for regular data transmissions.

The frame loss rate estimated from fragment measurements can then be reliably applied to estimate the loss rate for other transmissions.

B. Estimating Hidden Node Interference

To distinguish frame losses due to hidden node interference, we exploit the fact that frames transmitted after a PIFS are protected from collisions since other transmissions must defer for a DIFS interval after sensing the channel to be idle, with DIFS>PIFS. Although the PCF element is rarely implemented in 802.11 hardware, the ability to transmit after a PIFS is commonly supported.

Losses on PIFS frames are due either to noise or hidden node interference:

$$P[\text{PIFS success}] = A_1/T_1 = (1-P_h)(1-p_n), \qquad (3)$$

where the station transmits $T_1$ data frames after a PIFS and of these $A_1$ are successful because an ACK is received. We can now use our estimate of pn (based on fragment loss measurements, see equation (2)), to allow estimation of the probability ph of hidden node losses as:

$$ph = 1 - (A_1 \cdot T_S)/(A_S \cdot T_1) \qquad (4)$$

C. Estimating Collision Rate

Consider a station sending ordinary data packets (i.e. sent after DIFS and not fragmented) to a given receiver. Suppose that over some time period the station contends and transmits data frames $T_0$ times and of these $A_0$ are successful because an ACK is received. As discussed previously, the possible sources of frame loss are: collisions, hidden nodes and noise errors. Assuming that these sources of frame loss are independent, if the station transmits the probability of success over the link is:

$$P[\text{success}] = A_0/T_0 = (1-pc)(1-ph)(1-pn). \qquad (5)$$

Finally pc can be estimated from Eq. (5) and (3):

$$pc = 1 - (T_1 \cdot A_0)/(T_0 \cdot A_1). \qquad (6)$$

The above equations provide a straightforward approach for estimating the magnitude of those link impairments that lead to frame loss, namely collisions, hidden nodes and noise. The estimates require only very simple measurements that are readily available on commodity hardware.

We now consider methods for estimating capture and exposed node effects. These impairments do not lead directly to frame losses, but can nevertheless lead to unfairness in throughput/delay between interfering stations.

In order to estimate capture and exposed node effects we make use of additional measurements. In particular, measurements of channel idle and busy periods. Here idle/busy refers to time as measured in MAC slots rather than in PHY slots. Of course it will be appreciated, that while these additional measurements offer further insight into the wireless environment, they are not necessary to estimate the basic quantities pc, pn and ph.

A. MAC Slots

The slotted CSMA/CA process creates well-defined boundaries at which frame transmissions by a station are permitted.

The time between these boundaries we call MAC slots (as distinct from PHY slots). Considering operation from the viewpoint of a station, say station 1, we have the following possibilities:

1) Station 1 has transmitted and received an ACK. We call these slots successful transmissions.

2) Station 1 has transmitted, timed-out while waiting for an ACK and is about to resume its backoff. We call these slots unsuccessful transmissions.

3) Station 1 has seen the medium as idle and, if backoff is in progress, has decremented its backoff counter. We call these idle slots.

4) Station 1 has detected the medium as busy due to one or more other nodes transmitting, and has suspended its backoff until backoff can resume. We call these slots other transmissions, and include both successful and unsuccessful transmissions of other stations. Note that each busy period is counted as a single slot, so these busy slots are closer to the MAC's view than the PHY's.

Figure 4:
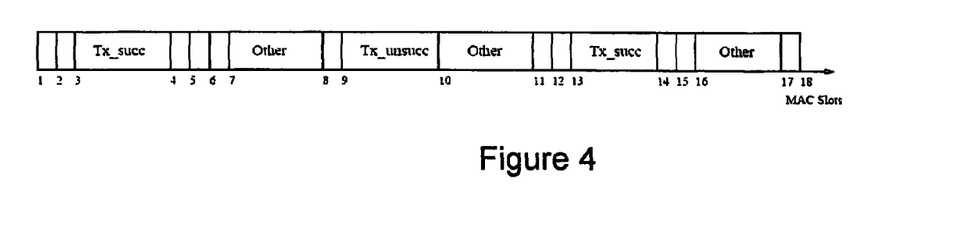
FIG. 4 shows MAC slot boundaries at which transmissions are permitted.

These events are illustrated (not to scale) in FIG. 4. Transmissions by station 1 are only permitted at event boundaries. Different types of MAC slot are possible: idle slots (corresponding to PHY slots), busy slots due to transmissions by other stations (marked "Other") and busy slots due to transmissions the station of interest (marked "Tx"). "Other" transmissions include both successful and unsuccessful transmissions.

We also assume that the probability that at least one other station transmits in an arbitrary slot does not depend on whether station 1 transmits or not; and the collision probability is independent of the backoff stage of station 1.

With these assumptions, the probability of a collision is then precisely the probability that at a slot boundary the channel is busy due to a transmission by one or more other stations. We note these assumptions are reasonable in a distributed random access MAC scheme such as CSMA/CA and, indeed, these assumptions are central to well-established models of 802.11 operation such as that of Bianchi referred to above and others, for example, D Malone, et al., "Modeling the 802.11 distributed coordination function in non-saturated heterogeneous condition", IEEE ACM T. Network, 15(1): 159-172, 2007, the disclosure of which is incorporated herein by reference.

B. Capture and Exposed Nodes

Suppose there are R MAC slots in which our station does not transmit and that I of these are idle. These quantities can be measured by appropriate sensing of the channel idle/busy status. The classification of a MAC slot as idle/busy relies on carrier sensing, using both carrier sensing mechanisms. Hence, this measurement is affected by exposed nodes and capture effects whereby the carrier sense indicates that the channel busy when in fact a transmission would be successful.

We therefore have that, $$pc + pexp + pplc = R - I/R, \qquad (7)$$

where pc is the collision probability, pexp the probability that the channel is sensed busy due to exposed node behavior and pplc the probability that the channel is sensed busy due to capture effects. Combining the estimate of pc from eq. (6) with the additional information in (7), we can estimate:

$$pexp + pplc = (T_1 \cdot A_0)/(T_0 \cdot A_1) - I/R. \qquad (8)$$

In effect we are estimating the number of collision losses that we expect based on the carrier sense environment and comparing it with the actual collision rate. The discrepancy, if any, provides a measure of exposed node and capture effects—both of which are associated with apparently busy slots during which a successful transmission can in fact take place.

It is appreciated that the above method can only directly estimate pexp+pplc, but the separate contributions of pexp and pplc can be determined indirectly, for example, by probing how pexp+pplc changes, firstly varying the carrier sensitivity, and then varying the transmit power value or the other vice versa.

Note that the idle/busy measurements can also be used to estimate the collision probability when there are no exposed node or capture effects, but this is not possible in the more general setting considered here.

Figure 3:
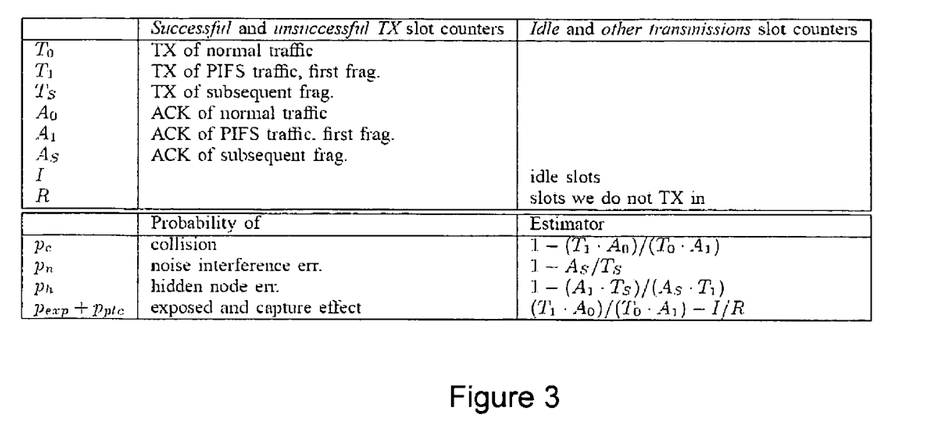
FIG. 3 comprises a summary of measurements used and estimators provided by the present invention.

In an exemplary embodiment, the foregoing estimators, summarized in FIG. 3, are implemented using a combination of driver and firmware modifications to commodity network cards using the Atheros AR5212/AR5213 and Intel 2915ABG chipsets.

The estimators of collision rate, hidden node and noise errors can be implemented via straightforward driver modifications, for example, on Atheros cards, MADWiFi driver can be used. To transmit frames after a PIFS interval we made use of the WME (Wireless Multimedia Enhancements) features, which allow dynamic adjustment of the TXOP, CWmin and AIFS parameters for each Access Category of 802.11e. In particular, we created an access category with MAC settings CWMin=CWMax=AIFSN=TXOP=0. All traffic sent via the queue associated with this access category is then transmitted using PIFS. A second access category and queue is defined for normal traffic. On this queue, data packets are fragmented in two fragments, which is sufficient for assessing our estimator. (Note that other traffic configurations are possible, e.g. to fragment only the PIFS traffic.)

By appropriately directing packets to these two queues, we can collect statistics for the overall number of transmissions $T_0$, $T_1$ and $T_S$ and number of successful transmissions $A_0$, $A_1$ and $A_S$ (transmissions for which a MAC ACK is received).

In our implementation, packets are allocated between queues at driver level, although other solutions are possible.

Pexp and Pplc require measurement of the number of R and I busy and idle MAC slots. This requires carrier sense information from the hardware. We modified the card firmware and microcode on cards using the Intel 2915ABG chipset to perform the necessary measurements and to expose these to the driver. Our implementation implicitly uses the same carrier-sense threshold as the rest of the MAC.

Figure 5:
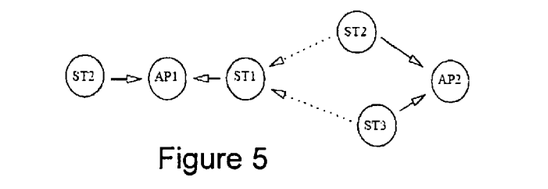
FIG. 5 shows a topology for hidden node tests.

To illustrate the practical use of the above measures, consider the following examples:

An exposed node is a sender station that senses the channel to be busy when, in fact, the channel at the receiver is idle and thus a successful transmission could have been made. A typical scenario is illustrated in FIG. 5. Here, ST3 and ST4 send data to AP2 while ST1 sends data to AP1. Sender ST1 overhears the data transmissions by ST3 and ST4 and senses the channel to be busy. This is incorrect, however, since the physical separation between ST3 and ST4 and AP1 means that transmissions by ST1 would in fact be received corrected at AP1 even when ST3 and ST4 are transmitting. ST1 therefore defers its backoff countdown unnecessarily and its throughput suffers.

In an example, based on the topology of FIG. 5, ST3 and ST4 send 300 fps traffic to Access Point AP2, while ST1 uses the same channel to send 20 fps traffic to AP1 and station ST2 300 fps to AP1. The channel is clean with no noise losses. In addition to measuring pc, pn and ph as before, we now also measure the total number of MAC slots R and the number I of slots which are detected idle. The value of (R−I)/R is a measure of the proportion of slots which the MAC detects to be busy via carrier sense. The collision probability pc provides a measure of the proportion of slots that are actually busy (in the sense that a transmission in that MAC slot would result in a collision). The difference between (R−I)/R and pc then provides a measure of how exposed a node is.

In this situation, measurements indicate that ST1 senses the channel to be busy around 10% too often i.e. pexp=10%. This suggests that ST1 may freeze its backoff counter unnecessarily for about 1 in 10 MAC slots We recall that exposed node effects are intimately related to the choice of carrier sense threshold used. In this scenario the carrier sense mechanism is too sensitive and ST1 senses the channel busy too often.

Figure 7:
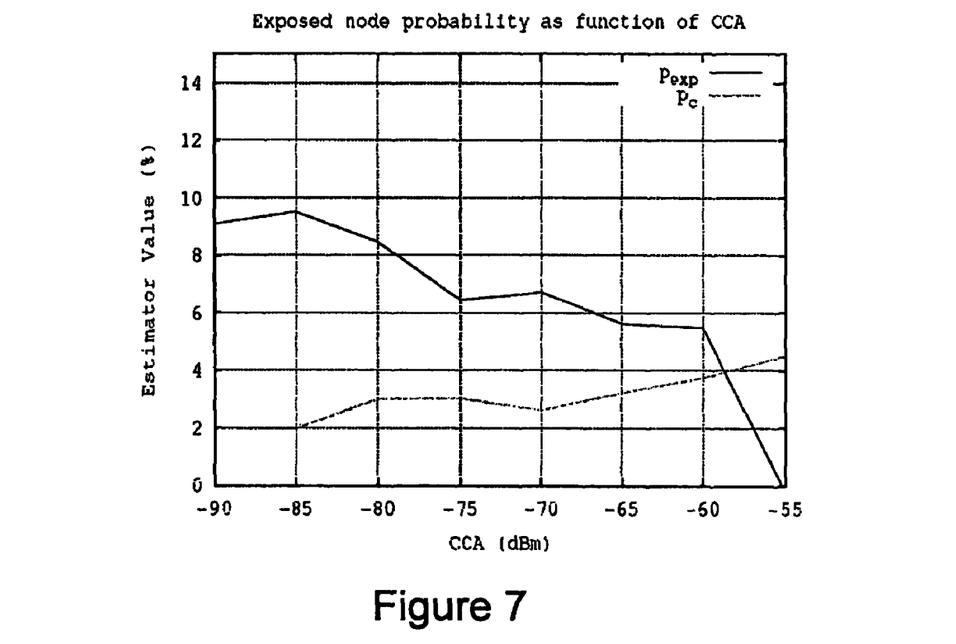
FIG. 7 shows exposed node probability Pexp v. carrier sense threshold.

This effect is illustrated in FIG. 7 which plots the estimated pexp vs. choice of carrier sense threshold for ST1 in the setup of FIG. 5. As expected, it can be seen that the exposed node probability pexp has the highest value for carrier sense thresholds in the range −90 dBm to −80 dBm. At around −75 dBm, the value of pexp decreases as the impact of ST3 disappears (confirmed by inspection of packet traces). Finally, moving the carrier sense threshold up to −55 dBm, the effect of ST4 also disappears and ST1 is no longer exposed.

Figure 8:
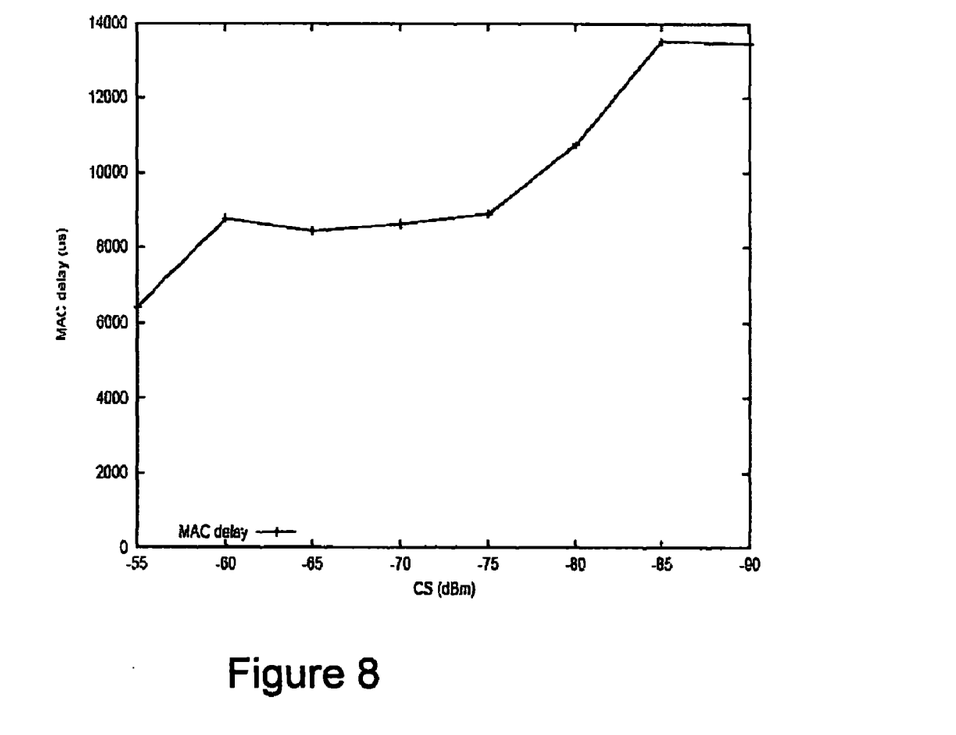
FIG. 8 shows MAC delay v. carrier sense threshold.

Also shown in FIG. 7 is the measured collision probability pc. It can be seen that this slightly increases as the carrier sense threshold is increased, which is to be expected as the backoff countdown of ST1 is becoming of shorter duration. The benefits of using a suitable choice of carrier sense threshold are illustrated in FIG. 8, which plots the estimated MAC delay (The mean time between a packet arriving at the head of the interface queue and being successfully transmitted) at ST1. It can be seen that the MAC delay is halved when the carrier sense threshold is increased to −55 dBm instead of −85 dBm.

While a description of a full carrier sense tuning algorithm is not necessary in the context of the present specification, it will be seen that measurements of pc and pexp can be used to optimize the carrier sense threshold employed at a wireless LAN station.

Figure 6:
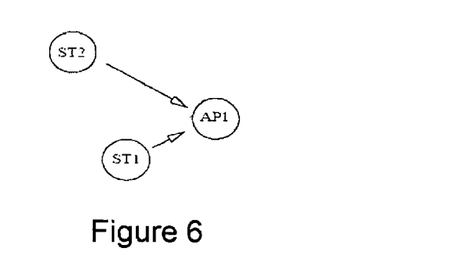
FIG. 6 shows a topology for exposed node tests.

At the same time, physical layer capture occurs when colliding transmissions have different received signal power. It may then happen that the transmission with highest power is successfully decoded even though it collides with another transmission. To assess the ability of the present estimator to measure this effect, we configured a testbed as shown in FIG. 6. Station ST1 sends data packets to AP1 at 20 fps. In addition we have four other contending stations transmitting data to AP1 at 300 fps, but with lower received signal power that ST1.

Figure 9:
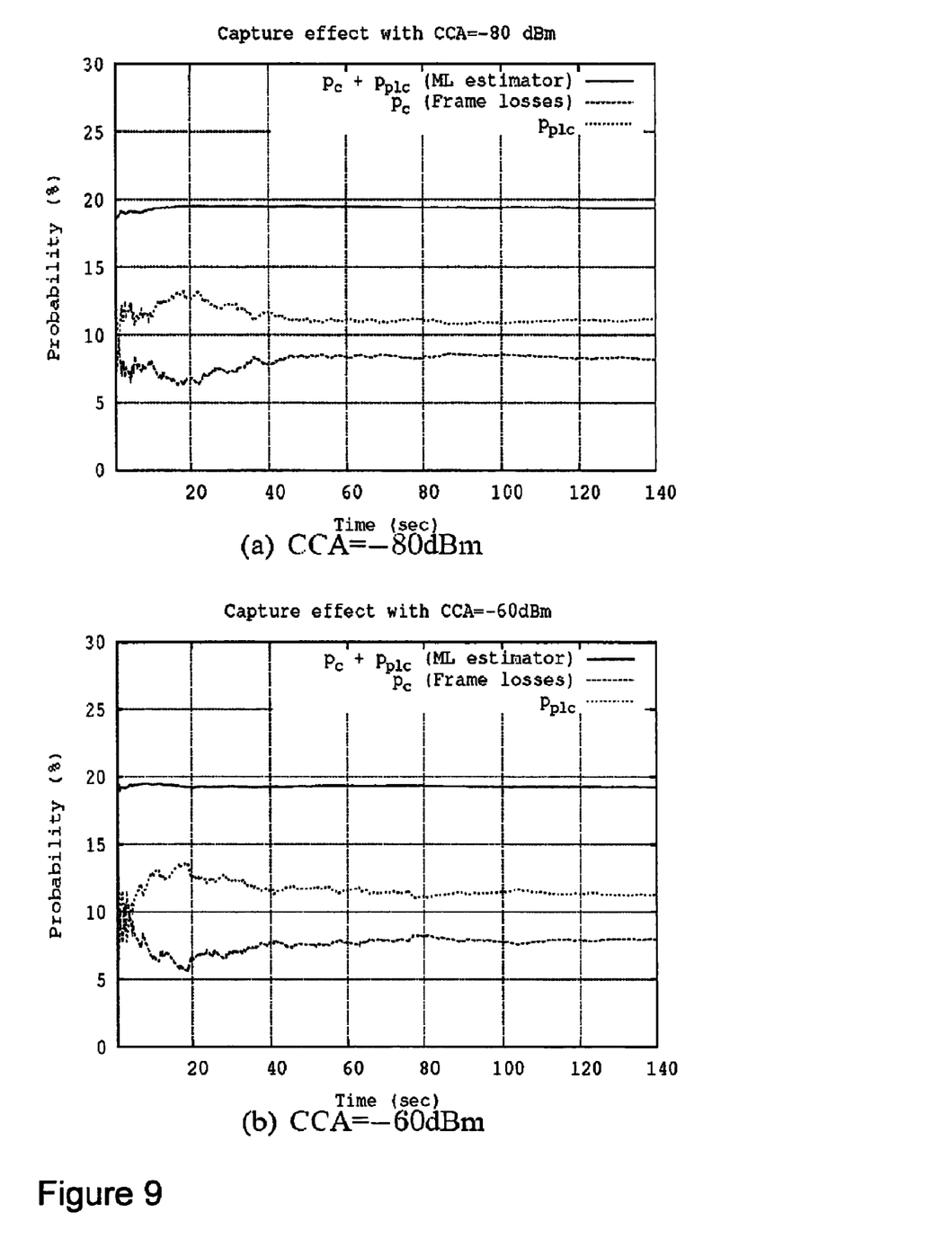
FIG. 9 demonstrates capture effect estimation.

FIG. 9 shows results for two different values of carrier sense threshold, to confirm the absence of exposed node effects in these tests based on the network setup of FIG. 6.

FIG. 9(a) illustrates the impact of physical layer capture. It can be seen that ST1 benefits from a lower than expected probability of collision. In particular, while with a total of five contending stations we expect a pc around 19% (based on measurements without capture) the measured collision rate at ST1 is only around 8%. The difference of 11% is a direct measure of the capture effect advantage experienced by ST1. To help validate the accuracy of this measurement, we took the same measurements with the carrier sense threshold increased to −60 dBm—this change will not affect capture but would eventually highlight the presence of exposed node effects, as discussed above. As can be seen from FIG. 9(b), we find that the estimates of pc and pplc are almost unchanged, confirming the absence of exposed node effects in these tests.

Figure 10:
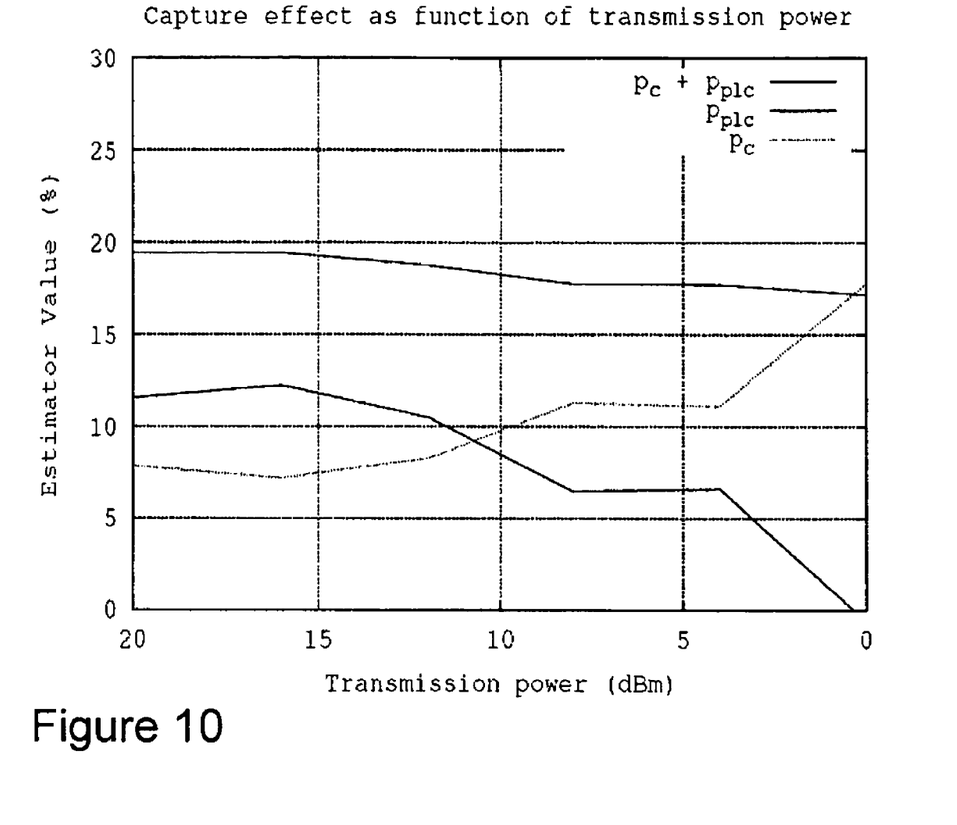
FIG. 10 shows measurements of capture effect v. transmit power

We now further explore our ability to measure the impact of the capture effect. Note that decreasing the transmission power at ST1 should reduce the capture effect. We confirm this experimentally in FIG. 10 which presents measurements of pc and pplc versus the transmit power at ST1. We can see that the capture probability pplc is greatest at the highest transmit power of 20 dBm and that pplc decreases to zero as the transmit power is reduced to 0 dBm. We observe that pc+pplc remains roughly constant as the transmit power is varied, with a value around the expected probability of collision for five saturated stations. Thus, by reducing the transmit power at ST1 we gain a double benefit: not only is electrical power consumption and radio interference with adjacent WLANs reduced, but the capture effect is removed and thus fairness restored between contending stations. The effect on fairness of tuning the transmit power can be analyzed in more detail by looking at the probability of collision for each node in the network.

We carried out tests with ST1 transmitting at 20 fps plus four other stations with saturated traffic. Table I summarizes the experimental measurements obtained. We can see that decreasing the transmit power at ST1 increases its probability of collision. Meanwhile, the other nodes maintain a roughly constant collision probability pc, thus improving fairness in the network. Note that pc is not identical at all stations due to remaining capture effects at stations other than ST1 (power asymmetries arise due to antenna tolerances, differences in physical location, etc.). Adjustment of the transmit power at all stations, could restore fairness.

TABLE I

| | node 1 | | | | | |
|---|---|---|---|---|---|---|
| TX power (dBm) | pc + pplc (%) | pc (%) | node 2 pc (%) | node 3 pc (%) | node 4 pc (%) | node 5 pc (%) |
| 16 | 18.8 | 2.3 | 14.9 | 11.0 | 17.3 | 15.9 |
| 13 | 18.4 | 5.5 | 13.6 | 12.4 | 18.1 | 16.3 |
| 10 | 18.0 | 9.9 | 14.5 | 10.9 | 17.6 | 16.1 |
| 7 | 17.6 | 11.9 | 14.3 | 12.3 | 17.3 | 16.0 |
| 4 | 17.5 | 15.6 | 12.1 | 12.7 | 17.7 | 16.1 |
| 1 | 17.5 | 17.1 | 14.1 | 10.6 | 17.8 | 16.3 |

In TABLE I, we observe that as transmit power is changed, the value of pc+pplc changes. A change in transmit power should only change pplc and for small transmit powers the probability of physical layer capture (pplc) should be almost zero. Thus, we can estimate pplc as the difference in pc+pplc at a usual operating power and at a low operating power. This can in turn be used to derive pexp. A similar process of moving the carrier sense threshold, as shown in FIG. 7, can also be used to eliminate the contribution of pexp and to dervice pplc.

The invention claimed is:

1. A method for determining a metric for link quality between a first node and a remote node of a wireless network, said nodes communicating using a handshake protocol in which said first node expects to receive an acknowledgement (ACK) of receipt of a data packet from said remote node, said method comprising the steps of:
   providing a measure for any combination of:
   a) noise-related losses (pn) between said first and remote nodes,
   b) collision induced losses (pc) between said first and remote nodes,
   c) hidden-node losses (ph) between said first and remote nodes,
   d) a slot being erroneously detected as busy when a successful transmission could have been made (pexp) between said first and remote nodes, and
   e) a probability of successful reception of a packet when a collision occurs (pplc) between said first and remote nodes,
   at least one of said combined measures being based on a number (A) of acknowledgements received from said remote node vis-à-vis a number (T) of packets transmitted to said remote node; and
   using said measure to determine said link quality metric between said first node and said remote node;
   wherein said nodes communicate using an IEEE 802.11 protocol and providing said measure comprises:
   measuring a collision induced loss probability pc as $pc=1-(T_1 \cdot A_0)/(T_0 \cdot A_1)$, where said first node contends and transmits data packets $T_0$ times and of these $A_0$ are successful because an ACK is received by said first node; and
   where the first node transmits $T_1$ data packets after a Priority Interframe Spacing (PIFS) interval, which is shorter than a Distributed Inter-Frame Space (DIFS) interval, and of these $A_1$ are successful because an ACK is received by said first node.

2. A method as claimed in claim 1 wherein said nodes communicate using either a two-way or a four-way handshake protocol.

3. A method as claimed in claim 1 further comprising the step of:
   selecting a channel for communication between said first and remote nodes based on the link quality metric.

4. A method as claimed in claim 1 further comprising the step of:
   adjusting carrier sensitivity based on the link quality metric including de-sensitizing carrier sensitivity to improve quality.

5. A method as claimed in claim 1 comprising:
   adjusting carrier sensitivity based on said measure of collision induced losses and said measure of a slot being erroneously detected as busy when a successful transmission could have been made between said first and remote nodes.

6. A method as claimed in claim 1 further comprising:
   adjusting transmit power at said first node based on the link quality metric including reducing power to improve quality.

7. A method as claimed in claim 6 comprising:
   adjusting transmit power based on said measure of collision induced losses and said probability of successful reception of a packet when a collision occurs between said first and remote nodes.

8. A method as claimed in claim 1 comprising:
   determining a respective link quality metric for each remote node with which said first node communicates across said wireless network.

9. A method for determining a metric for link quality between a first node and a remote node of a wireless network, said nodes communicating using a handshake protocol in which said first node expects to receive an acknowledgement (ACK) of receipt of a data packet from said remote node, said method comprising the steps of:

providing a measure for any combination of:
  a) noise-related losses (pn) between said first and remote nodes,
  b) collision induced losses (pc) between said first and remote nodes,
  c) hidden-node losses (ph) between said first and remote nodes,
  d) a slot being erroneously detected as busy when a successful transmission could have been made (pexp) between said first and remote nodes, and
  e) a probability of successful reception of a packet when a collision occurs (pplc) between said first and remote nodes,
  at least one of said combined measures being based on a number (A) of acknowledgements received from said remote node vis-à-vis a number (T) of packets transmitted to said remote node; and
using said measure to determine said link quality metric between said first node and said remote node;
wherein providing said measure comprises determining a noise-related loss probability pn as pn=1−$A_S$/$T_S$, where said first node transmits $T_S$ second and subsequent data packets and of these $A_S$ are successful because an ACK is received by said first node.

10. A method for determining a metric for link quality between a first node and a remote node of a wireless network, said nodes communicating using a handshake protocol in which said first node expects to receive an acknowledgement (ACK) of receipt of a data packet from said remote node, said method comprising the steps of:
providing a measure for any combination of:
  a) noise-related losses (pn) between said first and remote nodes,
  b) collision induced losses (pc) between said first and remote nodes,
  c) hidden-node losses (ph) between said first and remote nodes,
  d) a slot being erroneously detected as busy when a successful transmission could have been made (pexp) between said first and remote nodes, and
  e) a probability of successful reception of a packet when a collision occurs (pplc) between said first and remote nodes,
  at least one of said combined measures being based on a number (A) of acknowledgements received from said remote node vis-à-vis a number (T) of packets transmitted to said remote node; and
using said measure to determine said link quality metric between said first node and said remote node;
wherein said nodes communicate using an IEEE 802.11 protocol and providing said measure comprises:
  determining a hidden-node loss probability ph as ph=1−($A_1$·$T_S$)/($A_S$·$T_1$), where the first node transmits $T_1$ data packets after a Priority Interframe Spacing (PIFS) interval, which is shorter than a Distributed Inter-Frame Space (DIFS) interval, and of these $A_1$ are successful because an ACK is received by said first node; and
  where said first node transmits $T_S$ second and subsequent data packets and of these $A_S$ are successful because an ACK is received by said first node.

11. A method for determining a metric for link quality between a first node and a remote node of a wireless network, said nodes communicating using a handshake protocol in which said first node expects to receive an acknowledgement (ACK) of receipt of a data packet from said remote node, said method comprising the steps of:

providing a measure for any combination of:
  a) noise-related losses (pn) between said first and remote nodes,
  b) collision induced losses (pc) between said first and remote nodes,
  c) hidden-node losses (ph) between said first and remote nodes,
  d) a slot being erroneously detected as busy when a successful transmission could have been made (pexp) between said first and remote nodes, and
  e) a probability of successful reception of a packet when a collision occurs (pplc) between said first and remote nodes,
  at least one of said combined measures being based on a number (A) of acknowledgements received from said remote node vis-à-vis a number (T) of packets transmitted to said remote node; and
using said measure to determine said link quality metric between said first node and said remote node;
wherein said nodes communicate using an IEEE 802.11 protocol and providing said measure comprises:
  estimating a probability pexp that a slot is erroneously detected as busy when in fact a successful transmission could have been made; and
  estimating said probability pplc of successful reception of a packet when a collision occurs, as pexp+pplc=($T_1$·$A_0$)/($T_0$·$A_1$)−I/R where there are R MAC slots in which said first node does not transmit and that I of these are idle, where said first node contends and transmits data packets $T_0$ times and of these $A_0$ are successful because an ACK is received by said first node;
  where the first node transmits $T_1$ data packets after a Priority Interframe Spacing (PIFS) interval, which is shorter than a Distributed Inter-Frame Space (DIFS) interval, and of these $A_1$ are successful because an ACK is received by said first node.

12. A first node of a wireless network comprising:
a driver operable in the first node of the wireless network for determining a metric for link quality between the first node and a remote node of the wireless network, said nodes communicating using a handshake protocol in which said first node expects to receive an acknowledgement (ACK) of receipt of a data packet from said remote node, said driver being arranged to:
provide a measure for any combination of:
  a) noise-related losses (pn) between said first and remote nodes,
  b) collision induced losses (pc) between said first and remote nodes,
  c) hidden-node losses (ph) between said first and remote nodes,
  d) a slot being erroneously detected as busy when a successful transmission could have been made (pexp) between said first and remote nodes, and
  e) a probability of successful reception of a packet when a collision occurs (pplc) between said first and remote nodes,
  at least one of said combined measures being based on a number (A) of acknowledgements received from said remote node vis-à-vis a number (T) of packets transmitted to said remote node; and
use said measure to determine said link quality metric between said first node and said remote node;
wherein said nodes communicate using an IEEE 802.11 protocol and, in order to provide said measure, said driver being further arranged to:

measure a collision induced loss probability pc as $pc = 1 - (T_1 \cdot A_0)/(T_0 \cdot A_1)$, where said first node contends and transmits data packets $T_0$ times and of these $A_0$ are successful because an ACK is received by said first node; and where the first node transmits $T_1$ data packets after a Priority Interframe Spacing (PIFS) interval, which is shorter than a Distributed Inter-Frame Space (DIFS) interval, and of these $A_1$ are successful because an ACK is received by said first node.

13. A first node of a wireless network comprising:

a driver operable in the first node of the wireless network for determining a metric for link quality between the first node and a remote node of the wireless network, said nodes communicating using a handshake protocol in which said first node expects to receive an acknowledgement (ACK) of receipt of a data packet from said remote node, said driver being arranged to:

provide a measure for any combination of:
  a) noise-related losses (pn) between said first and remote nodes,
  b) collision induced losses (pc) between said first and remote nodes,
  c) hidden-node losses (ph) between said first and remote nodes,
  d) a slot being erroneously detected as busy when a successful transmission could have been made (pexp) between said first and remote nodes, and
  e) a probability of successful reception of a packet when a collision occurs (pplc) between said first and remote nodes,
  at least one of said combined measures being based on a number (A) of acknowledgements received from said remote node vis-à-vis a number (T) of packets transmitted to said remote node; and use said measure to determine said link quality metric between said first node and said remote node;

wherein, in order to provide said measure, said driver is further arranged to determine a noise-related loss probability pn as $pn = 1 - A_S/T_S$, where said first node transmits $T_S$ second and subsequent data packets and of these $A_S$ are successful because an ACK is received by said first node.

14. A first node of a wireless network comprising:

a driver operable in the first node of the wireless network for determining a metric for link quality between the first node and a remote node of the wireless network, said nodes communicating using a handshake protocol in which said first node expects to receive an acknowledgement (ACK) of receipt of a data packet from said remote node, said driver being arranged to:

provide a measure for any combination of:
  a) noise-related losses (pn) between said first and remote nodes,
  b) collision induced losses (pc) between said first and remote nodes,
  c) hidden-node losses (ph) between said first and remote nodes,
  d) a slot being erroneously detected as busy when a successful transmission could have been made (pexp) between said first and remote nodes, and
  e) a probability of successful reception of a packet when a collision occurs (pplc) between said first and remote nodes,
  at least one of said combined measures being based on a number (A) of acknowledgements received from said remote node vis-à-vis a number (T) of packets transmitted to said remote node; and use said measure to determine said link quality metric between said first node and said remote node;

wherein said nodes communicate using an IEEE 802.11 protocol and, in order to provide said measure, said driver being further arranged to:
  determine a hidden-node loss probability ph as $ph = 1 - (A_1 \cdot T_S)/(A_S \cdot T_1)$, where the first node transmits $T_1$ data packets after a Priority Interframe Spacing (PIFS) interval, which is shorter than a Distributed Inter-Frame Space (DIFS) interval, and of these $A_1$ are successful because an ACK is received by said first node; and
  where said first node transmits $T_S$ second and subsequent data packets and of these $A_S$ are successful because an ACK is received by said first node.

15. A first node of a wireless network comprising:

a driver operable in the first node of the wireless network for determining a metric for link quality between the first node and a remote node of the wireless network, said nodes communicating using a handshake protocol in which said first node expects to receive an acknowledgement (ACK) of receipt of a data packet from said remote node, said driver being arranged to:

provide a measure for any combination of:
  a) noise-related losses (pn) between said first and remote nodes,
  b) collision induced losses (pc) between said first and remote nodes,
  c) hidden-node losses (ph) between said first and remote nodes,
  d) a slot being erroneously detected as busy when a successful transmission could have been made (pexp) between said first and remote nodes, and
  e) a probability of successful reception of a packet when a collision occurs (pplc) between said first and remote nodes,
  at least one of said combined measures being based on a number (A) of acknowledgements received from said remote node vis-à-vis a number (T) of packets transmitted to said remote node; and use said measure to determine said link quality metric between said first node and said remote node;

wherein said nodes communicate using an IEEE 802.11 protocol and, in order to provide said measure, said driver being further arranged to:
  estimate a probability pexp that a slot is erroneously detected as busy when in fact a successful transmission could have been made; and
  estimate said probability pplc of successful reception of a packet when a collision occurs, as $pexp + pplc = (T_1 \cdot A_0)/(T_0 \cdot A_1) - I/R$ where there are R MAC slots in which said first node does not transmit and that/of these are idle, where said first node contends and transmits data packets $T_0$ times and of these $A_0$ are successful because an ACK is received by said first node;
  where the first node transmits $T_1$ data packets after a Priority Interframe Spacing (PIFS) interval, which is shorter than a Distributed Inter-Frame Space (DIFS) interval, and of these $A_1$ are successful because an ACK is received by said first node.

* * * * *